United States Patent [19]

Difazio et al.

[11] 3,892,857

[45] July 1, 1975

[54] STEROID FORMULATION

[75] Inventors: Louis Thomas Difazio, Somerville; Matthew Anthony Augustine, Allentown, both of N.J.

[73] Assignee: E. R. Squibb & Sons, Inc., Princeton, N.J.

[22] Filed: Nov. 24, 1972

[21] Appl. No.: 309,295

[52] U.S. Cl............................ 424/241; 260/239.55 D
[51] Int. Cl.² .......................................... A61K 31/58
[58] Field of Search............. 424/241; 260/239.55 D

[56] References Cited
UNITED STATES PATENTS 3,644,340   2/1972   Berkoz........................ 260/239.55 D
3,758,686   10/1973  Sieger et al. ................ 260/239.55 D Primary Examiner—Elbert L. Roberts
Attorney, Agent, or Firm—Lawrence S. Levinson; Merle J. Smith; Burton Rodney

[57] ABSTRACT

A steroid formulation having enhanced properties for topical application comprises 21-chloro-9α-fluoro-$\Delta^4$-pregnene-11β,16α,17α-triol-3,20-dione 16,17-acetonide in a vehicle containing as major ingredients propylene glycol and water.

8 Claims, No Drawings

STEROID FORMULATION

OBJECT OF THE INVENTION

It is an object of the present invention to provide an improved composition for the topical application of 21-chloro-9α-fluoro-Δ⁴-pregnene-11β,16α,17α-triol-3,20-dione 16,17-acetonide. Another object is to provide a composition wherein a predetermined part of the steroid is in solution and a predetermined part is in suspension. A further object is to provide a composition which does not require the presence of preservatives. Still another object is to provide a composition which is non-stinging and non-irritating. Yet another object is to provide a composition which is clinically effective for both "dry" and "weeping" lesions. Still another object is to provide a composition which is effective in treating dermatitis. These and other objects of the present invention will be apparent from the following description.

SUMMARY OF THE INVENTION

The present invention provides a steroid composition having enhanced properties for topical application. The steroid employed in the present invention is 21-chloro-9α-fluoro-Δ⁴-pregnene-11β,16α,17α-triol-3,20-dione 16,17-acetonide. The composition according to the present invention for topical application of the foregoing steroid comprises as major ingredients propylene glycol and water. The propylene glycol is present in an amount of from about 30% by weight to about 70% by weight based on total weight of the composition and water is present in an amount of from about 7% by weight to about 45% by weight based on total weight of the composition.

The steroid is present in an amount of from about 0.005% by weight to about 0.2% by weight, based on the total weight of the composition. The propylene glycol is present in an amount of from about 30% by weight to about 70% by weight based on the total weight of the composition. Water is present in an amount of from about 7% by weight to about 45% by weight based on the total weight of the composition. The higher amounts of water are associated with the lower amounts of propylene glycol. The quantity of propylene glycol in the composition must be sufficient to solubilize at least about 30% by weight of the steroid, and up to a maximum of about 75% by weight of the steroid.

Expressed another way the compositions of the present invention contain, with respect to propylene glycol and water, from about 40% by weight to about 90% by weight of propylene glycol, and, correspondingly, from about 60% by weight to about 10% by weight of water. The propylene glycol and water together make up from about 73% to about 82% of the total weight of the composition. The balance of the composition is made up of oleaginous material, emulsifying agent, and steroid.

The solubility of the steroid increases as the propylene glycol content increases. The following table shows the parts by weight of steroid that are soluble at room temperature in a composition of propylene glycol and water.

Table I

| % by weight propylene glycol | 40 | 50 | 60 | 70 | 80 | 90 |
|---|---|---|---|---|---|---|
| % by weight water | 60 | 50 | 40 | 30 | 20 | 10 |
| Parts by weight of steroid in solution at room temperature | 0.002 | 0.008 | 0.015 | 0.047 | 0.060 | 0.110 |

From about 30% by weight to about 75% by weight of the steroid is in solution and the remainder is in suspension. The compositions contain from about 15% to about 25% oleaginous materials.

DETAILED DESCRIPTION

The present invention provides a composition for topical application of a steroid wherein a predetermined part of the steroid is in solution and a predetermined part is in suspension.

The compositions of the present invention comprise propylene glycol and water in predetermined ratios and a steroid, 21-chloro-9α-fluoro-Δ⁴-pregnene-11β,16α,17α-triol-3,20-dione 16,17-acetonide, having the structural formula

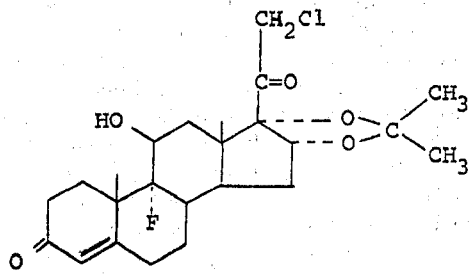

The compositions of the present invention also preferably contain from about 15% by weight to about 25% by weight of oleaginous materials. The oleaginous materials are those conventionally employed in topical creams and include thickeners such as, for example, monoglycerides and fatty alcohols, and also contain emollients, such as fatty acid esters of alcohols having from about 3 to about 16 carbon atoms. Examples of suitable monoglycerides are glyceryl monostearate, glyceryl monooleate, glyceryl monopalmitate and glyceryl ricinoleate. Examples of fatty alcohols are cetyl alcohol, lauryl alcohol and myristyl alcohol. Examples of suitable esters are myristyl stearate and isopropyl palmitate. The monoglyceride also functions as an emulsifier. Preferably, a small amount of an emulsifying agent is present. Suitable emulsifying agents are the non-ionic polyoxyalkylene derivatives of hexitol anhydride partial long chain fatty acid esters, e.g., the polyoxyalkylene derivatives of sorbitan monolaurate, sorbitan monopalmitate, sorbitan monostearate, sorbitan tristearate, sorbitan monooleate or sorbitan trioleate. These emulsifying agents are commercially available as Tween 20, 21, 40, 60, 65, 80, 81 and 85.

Amounts of steroid in excess of the amount in solution will remain in dispersion in microcrystalline form in the vehicle containing the steroid. As the steroid is absorbed from the solution, the dispersed microcrystalline steroid is dissolved in the aqueous propylene glycol thereby maintaining a saturated solution of the steroid during topical application. The steroid formulation of the present invention possesses a desirable degree of occlusiveness whereby moisture resulting from an increase in skin hydration (due to the occlusiveness of the topical vehicle) helps balance water vapor lost from the vehicle through evaporation. As a result a dynamic system is achieved which maintains a saturated solution of the steroid in the vehicle.

An advantage of the steroid formulation of the present invention is that the incorporation of preservatives is not necessary inasmuch as the level of propylene glycol employed imparts antimicrobial properties. Another advantage is that the steroid formulation of the present invention is non-irritating and non-stinging even when used under occlusion due to the presence of water.

The following examples illustrate the present invention without, however, limiting the same thereto. All temperatures are expressed in degrees Centigrade.

EXAMPLE 1

A. 16α-Hydroxy-9α-Fluorohydrocortisone Acetonide 21-Mesylate

To a solution of 1.5 g. of 16α-hydroxy-9α-fluorohydrocortisone acetonide in 15 ml. of dry pyridine is added at 0°, 1.5 ml. of methane-sulfonyl chloride. After standing in the refrigerator for 2½ hours, excess methane-sulfonyl chloride is destroyed by the addition of a small amount of ice, after which ice-water is added slowly to precipitate the reaction product. After ½ hour in the refrigerator the material is filtered off, washed throughly with water and dried in vacuo. The resulting crude material after recrystallization from acetone-hexane gives the pure 21-mesylate of the following properties: M.P. about 225°–227° (dec.); $[\alpha]_D^{23} +112°$ (c., 0.5 in chlf.);
$\lambda_{max.}^{NuJol.}$ 2.86; 2.94; 5.76; 5.90; 5.96; 6.14μ.

B.
21-Chloro-9α-Fluoro-Δ⁴-Pregnene-11β,16α,17α-Triol-3,20-Dione 16,17-Acetonide

A solution of 200 mg. of the acetonide 21-mesylate from part A and 900 mg. of lithium chloride in 25 ml. of dimethyl formamide is kept at 100° for 24 hours. The mixture is poured on ice, extracted with chloroform and the chloroform extract washed with water and dried over sodium sulfate. Evaporation of the solvent in vacuo furnishes the crystalline chloride, which after recrystallization from acetone-ethanol has the following properties: M.P. about 276°–277°.

EXAMPLES 2–6

Topical creams are formulated from the following ingredients:   A.   21-chloro-9α-fluoro-Δ⁴-pregnene-11β,16α,17α-triol-3,20-dione 16,17-acetonide
B. Glyceryl monostearate
C. Cetyl alcohol
D. Myristyl stearate
E. Isopropyl palmitate
F. Tween 60
G. Propylene glycol
H. Water U.S.P.

EXAMPLE

| Ingredient | 2 | 3 | 4 | 5 | 6 |
|---|---|---|---|---|---|
| | Parts by weight | | | | |
| A. | 0.05 | 0.10 | 1.00 | 1.00 | 2.00 |
| B. | 120.12 | 94.44 | 94.44 | 70.30 | 94.44 |
| C. | 29.25 | 22.22 | 22.22 | 18.25 | 22.22 |
| D. | 65.22 | 55.56 | 55.56 | 44.28 | 55.56 |
| E. | 26.95 | 22.22 | 22.22 | 18.19 | 22.22 |
| F. | 33.33 | 33.33 | 33.33 | 33.33 | 33.33 |
| G. | 300.00 | 400.00 | 600.00 | 700.00 | 700.00 |
| H. | 437.93 | 372.13 | 171.23 | 115.65 | 70.23 |
| | 1000.00 | 1000.00 | 1000.00 | 1000.00 | 1000.00 |
| % by weight of steroid in solution | 35 | 59 | 39 | 71 | 58 |

PROCEDURE

1. The myristyl stearate, cetyl alcohol, glyceryl monostearate, isopropyl palmitate and about one-third of the Tween 60 are heated to about 90° and melted. (2) The theoretical quantity of steroid which is soluble in the final product is dissolved in about 90% of the propylene glycol with gentle warming. (3) The balance of the Tween 60 is mixed with the water, the mixture heated to about 90° and added to the steroid-propylene glycol solution which is also at a temperature of about 90°. (4) The oil phase from step 1 is added to the aqueous glycol phase and mixed rapidly at about 90°. The mixing is continued until emulsification is complete. The cream is then cooled to room temperature. (5) The remaining microcrystalline steroid is slurried in the remaining propylene glycol and blended into the cream at room temperature until uniform.

EXAMPLE 7

A group of 90 patients (44 males, 46 females) ranging in age from 8 to 72 years, the majority of whom (94%) were adults, having bilateral lesions of similar severity, persistency and etiology were subjected to a double-blind, paired comparison study. Forty-five patients had psoriasis; 23 eczematous dermatitis; 13 neurodermatitis; and 9 atopic dermatitis. Commercially available betamethasone-17-valerate cream formulation served as the control and was applied to one of the bilateral lesions; the formulation of example 4 was applied to the other. Each patient applied both creams in similar fashion three times daily for a three-week treatment period. Statistically significant superiority of the composition of example 4 was maintained each week in those categories (psoriasis and eczematous dermatitis) where more than 20 patients were treated. This is contrary to the usual experience with topical anti-inflammatory drugs containing potent fluorinated corticosteroids where the apparent differences between preparations tend to equalize with time. When all the patients were evaluated, the number of excellent and good responses comprised 74% of the total for the composition of example 4 and 53% for bethamethasone-17-valerate. For those patients who had psoriasis, these percentages were 81 and 60 for the composition of example 4 and bethamethasone-17-valerate, respectively. The same pattern was observed for atopic dermatitis, eczematous dermatitis and neurodermatitis.

What is claimed is:

1. A cream composition for topical application comprising from about 0.05 part to about 2.0 parts by weight of 21-chloro-9α-fluoro-Δ⁴-pregnene-11β,16α,17α-triol-3,2-,dione 16,17-acetonide, from about 300 to about 700 parts by weight of propylene glycol, from about 70 to about 440 parts by weight of water, about 33 parts by weight of polyoxyalkylene derivative of hexitol anhydride partial long chain fatty acid ester, and from about 180 to about 260 parts by weight of monoglyceride of fatty acid of from 16 to 18 carbon atoms, fatty alcohol of from 12 to 16 carbon atoms, or fatty acid ester of alcohol having from 3 to about 16 carbon atoms, the lower amounts of the steroid being employed with the lower amounts of propylene glycol, and the higher amounts of the steroid being employed with the higher amounts of propylene glycol, whereby from about 30 to about 75 % by weight of the steroid is in solution in the propylene glycol.

2. A composition according to claim 1 which contains from about 0.01% by weight to about 0.2% by weight of steroid, from about 30% by weight to about 70% by weight of propylene glycol, from about 7% by weight to about 45% by weight of water, about 3% polyoxyalkylene derivative of hexitol anhydride partial long chain fatty acid ester, and from about 15 to about 25% by weight of monoglyceride of fatty acid of from 16 to 18 carbon atoms, fatty alcohol of from 12 to 16 carbon atoms, or fatty acid ester of alcohols having from 3 to about 16 carbon atoms, the percentages of propylene glycol and water being such that from about 30 to about 75% by weight of the steroid is in solution in the propylene glycol.

3. A composition according to claim 1 which contains with respect to propylene glycol and water from about 40% by weight to about 90% by weight of propylene glycol and, correspondingly, from about 60% by weight to about 10% by weight of water, the propylene glycol and water together accounting for from about 73% by weight to about 82% by weight of the total composition, from about 0.1% by weight to about 0.2% by weight of steroid, about 3% polyoxyalkylene derivative of hexitol anhydride partial long chain fatty acid ester and from about 15 to about 25% monoglyceride of fatty acid of from 16 to 18 carbon atoms, fatty alcohol of from 12 to 16 carbon atoms, or fatty acid ester of alcohols having from 3 to about 16 carbon atoms.

4. A composition according to claim 1 which contains about 1 part by weight of steroid, about 94 parts by weight of glyceryl monostearate, about 22 parts by weight of cetyl alcohol, about 55 parts by weight of myristyl stearate, about 22 parts by weight of isopropyl palmitate, about 33 parts by weight of polyoxyethylene sorbitan monostearate, about 600 parts by weight of propylene glycol, and about 171 parts by weight of water.

5. A method of treating dermatitis which comprises administerming topically an effective amount of a composition of claim 1.

6. A method of treating dermatitis which comprises administering topically an effective amount of a composition of claim 2.

7. A method of treating dermatitis which comprises administering topically an effective amount of a composition of claim 3.

8. A method of treating dermatitis which comprises administering topically an effective amount of a composition of claim 4.

* * * * *

UNITED STATES PATENT AND TRADEMARK OFFICE
CERTIFICATE OF CORRECTION

PATENT NO. : 3,892,857
DATED : July 1, 1975
INVENTOR(S) : Louis Thomas DiFazio et al.

It is certified that error appears in the above-identified patent and that said Letters Patent are hereby corrected as shown below:

Column 5, line 19, "3,2-" should read --3,20--.
Column 6, line 31, "administerming" should read --administering--

Signed and Sealed this

Thirty-first Day of August 1976

[SEAL]

Attest:

RUTH C. MASON
Attesting Officer

C. MARSHALL DANN
Commissioner of Patents and Trademarks